United States Patent Office 3,331,730
Patented July 18, 1967

3,331,730
POLYMERIZATE OF PHENOLIC RESINS ESTERIFIED WITH UNSATURATED MONOCARBOXYLIC ACIDS AND LAMINATES THEREFROM
Claude Thomas Bean, Jr., Niagara Falls, and Donald H. Thorpe, Williamsville, N.Y., assignors to Hooker Chemical Corporation, Niagara Falls, N.Y., a corporation of New York
No Drawing. Filed May 31, 1966, Ser. No. 553,644
24 Claims. (Cl. 161—192)

This is a continuation-in-part of application Ser. No. 143,542, filed Oct. 9, 1961 now abandoned.

This invention broadly relates to new polymers and a novel process for their preparation. In some of its more specific aspects, the invention further relates to the preparation of improved castings, laminates, and reinforced plastic articles comprising the polymers of the invention and to the products thus prepared.

The use of monofunctional materials in polymers generally has not received acceptance in the art since such materials terminate the polymer chains. However, it has been discovered that there is a variety of monofunctional materials which when combined with certain other materials result in an improved polymer. In accordance with one important aspect of the present invention, suitable polyfunctional materials may be used with monofunctional material and/or a second polyfunctional material to produce desirable plastic products that are characterized by, among other things, low cost, flame resistance, low density, good electrical properties, high strength, convenient handling characteristics and freedom from undue discoloration.

Phenolic condensation products which are fusible and soluble, such as novolaks or resoles, are useful in the process of the present invention as the polyfunctional material which may be reacted with the mono and/or second polyfunctional material. As a typical example, a novolak resin which is a condensation product of a phenol and formaldehyde may be reacted with a mixture of mono and polyfunctional materials of such a nature that the hydroxyl groups of the novolak are blocked from further reaction by esterification and/or etherification and then the resinous resultant product may be polymerized through remaining functional groups of the esterifying and/or etherifying materials. By the esterification or etherification of the free reactive phenolic hydroxyl groups of the novolak, the remaining ortho or para positions of the phenolic residues are rendered inactive to normal condensation polymerization with substances such as aldehydes or ketones.

Phenolic resins have been used in laminating and molding operations of the prior art where high temperatures and pressures are necessary in order to obtain suitable products because in condensation polymerization, water or ammonia is eliminated. The resultant products had only fair flame resistance, and phenolic resins also are generally dark colored and darken to even deeper hues on exposure to light, exhibit poor alkali resistance, and have other serious disadvantages. The art has long sought polymers which combine the desirable properties of the phenolic resins with other desirable properties such as light colors and an ability to be cured to high-strength products by addition polymerization without elimination of water, ammonia or other by-product, at low or contact pressure, and which may be produced at low cost. However, prior to the present invention, entirely satisfactory polymers having the above characteristics were not available.

It is an object of the present invention to provide a novel process for the preparation of improved polymers based on fusible, solvent soluble condensates of a phenol and an aldehyde, and to provide the polymers thus prepared.

It is still a further object of the present invention to provide a novel process for preparing improved curable thermoplastic polymers from phenol-aldehyde condensates, a process for preparing thermoset polymers therefrom, and to provide the thermoset polymers thus prepared.

It is still a further object of the present invention to prepare improved polyester resins from phenol-aldehyde condensates, and to provide the polymers thus prepared.

It is still a further object of the present invention to provide a novel polymerizable composition of matter comprising an ethylenically unsaturated polymer of the invention and an ethylenically unsaturated monomer copolymerizable therewith.

It is still a further object of the present invention to provide improved castings, laminates, reinforced plastic articles.

Still other objects and advantages of the present invention will be apparent to those skilled in the art upon reference to the following detailed description and the examples.

In accordance with one important variant of the present invention, it has been discovered that fusible, solvent soluble condensation products of a phenol and an aldehyde containing condensate units having reactive phenolic hydroxyl groups may be reacted through the phenolic hydroxyl groups with a compound which is ethylenically unsaturated, to thereby provide curable thermoplastic polymers which may be cured to produce improved thermoset polymers having the desirable properties mentioned herein. Soluble, fusible phenol-aldehyde condensates suitable for use as starting materials in practicing the present invention are well known to the art and may be prepared by well known methods. The phenol-aldehyde condensate should be soluble in organic solvents such as acetone and it should not be advanced to the insoluble "C" stage or resite stage. When the phenol is phenol itself and the aldehyde is formaldehyde, one type of condensate which is highly satisfactory contains condensation units which may be exemplified by the following formula:

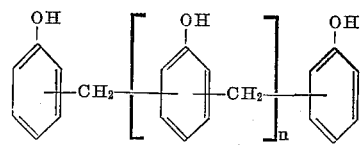

where $n$ may represent a numeral varying from one to ten, and often higher provided the resin is fusible and acetone or organic solvent-soluble. Preferably, the phenol-aldehyde condensate is a novolak, which contains more than one mole of phenol per mole of aldehyde, and an average of at least 3 phenolic nuclei.

Examples of phenols which may be used in preparing phenol-aldehyde condensates for use in practicing the invention include phenol itself or substituted phenols having the following general formula:

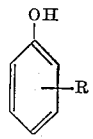

where R may be H, F, Cl, Br or a suitable substituent selected from the following:

(a) Alkyl groups of one to eighteen carbon atoms in any of their isomeric forms and substituted on the phenolic nucleus in the ortho, meta or para positions;

(b) Alicyclic groups of five to eighteen carbon atoms such as cyclohexyl, cyclopentyl, methyl cyclohexyl, butylcyclohexyl, etc.;

(c) Aromatic or aralkyl groups of six to eighteen carbon atoms such as phenyl, alpha-methyl benzyl, benzyl, cumyl, etc.;

(d) Alkyl, alicyclic, aryl and aralkyl ketones wherein the hydrocarbon is defined hereinbefore;

(e) Alkyl, alicyclic, aryl and aralkyl carboxylic groups wherein the hydrocarbon is defined hereinbefore.

Suitable substituted phenols include the following: para - tertiary - butylphenol, para-secondary-butylphenol, para-tertiary-amylphenol, para - secondary - amylphenol, para-tertiary - hexylphenol, para - isooctyl-phenol, para-phenylphenol, para-benzylphenol, para-cyclohexylphenol, para-decyl-phenol, para-dodecyl-phenol, para-tetra-decyl-phenol, para-octa-decyl-phenol, para-nonyl-phenol, para-methyl-phenol, para-beta-naphthyl-phenol, para - alpha-naphthyl - phenol, para - pentadecyl-phenol, para-cetyl-phenol, para-cumyl - phenol, para-hydroxy acetophenone, para-hydroxy benzophenone, a phenol alkylated with limonene, a phenol alkylated with oleic acid, as well as the corresponding ortho and meta derivatives such as meta-butyl phenol and ortho-butyl phenol; as well as mixtures thereof.

From the foregoing, it is apparent that substantially any phenol may be used in practicing the present invention provided it has a reactive hydroxyl group and is capable of reacting with aldehydes such as formaldehyde to produce a condensate. The pure refined phenols may be used, but this is not always necessary. For instance, phenols may be alkylated and then reacted with an aldehyde as the crude product which may contain some polyalkylated as well as unalkylated phenols. Mixtures of phenols mentioned herein also may be used.

In producing the parent phenol-aldehyde condensates, any suitable aldehyde or mixtures of aldehydes capable of reacting with a phenol and having not more than, for example, eight carbon atoms is satisfactory provided it does not contain a functional group or structure which is detrimental to the resinification reaction or with esterification or oxyalkylation of the resin. The preferred aldehyde is formaldehyde, which may be in aqueous solution or in any of its low polymeric forms such as paraform or trioxane. Other examples of aldehydes include acetaldehyde, propionaldehyde, butyraldehyde, benzaldehyde, furfural, 2-ethylhexanal, ethylbutyraldehyde, heptaldehyde, glyoxal, etc.

The amount of aldehyde to be condensed with the phenol may be varied to prepare novolaks of varying molecular weights and the viscosity of the finished resin may be controlled by the molecular weight of the novolak. Preferably, the amount of aldehyde varies from 0.5 to 1.0 mol per mol of the phenol when a mono for difunctional phenol is used. In instances where a trifunctional phenol is used, the preferred upper limit of aldehyde may be about 0.85 mol per mol of phenol so as to prevent formation of insoluble and infusible condensates.

In instances where a novolak is prepared using the above-described ratios of aldheyde to phenol, it is preferred that the aldehyde and phenol be reacted using an acid catalyst such as sulfuric, hydrochloric or oxalic acid, but basic catalysts may also be used. In some instances catalysts may not be necessary. Examples of alkaline catalysts include ammonia, amines and quaternary ammonium bases. Wetting agents of the anionic type such as sodium alkyl aryl sulfonate, may speed up the reaction when weak acids are used and also may be present.

In instances where a resole is prepared, more than one mol of formaldehyde per mol of phenol may be useful. The specific phenols and aldehydes which may be used are described above, and the alkaline catalysts described above also are useful. The resoles have carbinol groups as well as phenolic hydroxyl groups which may be reacted with the reagents to be discussed hereinafter.

In accordance with the present invention, improved polymers can be prepared which preferably contain substantially no free reactive phenolic groups (less than about 0.5 percent of the phenolic hydroxyl, for example), present originally in the phenol-aldehyde condensate. The phenol-aldehyde resin can be reacted with a substance designed to esterify the phenolic hydroxyl groups provided that more than one of the phenolic hydroxyl groups present in each phenol-aldehyde condensate unit is reacted with an ethylenically unsaturated compound. For instance, the phenolic hydroxyl groups of the phenol-aldehyde condensate can be reacted directly with an anhydride or acid chloride of an ethylenically unsaturated monocarboxylic acid containing less than six carbon atoms such as acrylic, methacrylic, crotonic, ethacrylic, propacrylic, pentenoic, hexanoic, methylpentenoic, chloroacrylic and other chlorine-substituted derivatives of the acids, and the like, to thereby esterify more than one phenolic hydroxyl group per condensate unit with a chloride or anhydride having polymerizable unsaturation. The anhydrides and acid chlorides of acrylic acid and methacrylic acid are preferred for direct esterification. Much better results are obtained when the carboxylic acid or its derivative for direct esterification contains not more than six carbon atoms than with higher acids.

Since the phenol-formaldehyde condensates may have from three to twelve phenolic nuclei per condensate unit, it is necessary to esterify only an average of slightly more than one phenolic hydroxyl group per condensate unit with an ethylenically unsaturated substituent containing an isolated addition-polymerizable carbon-carbon double bond to obtain cross-linking. The remainder of the phenolic hydroxyl groups may be esterified with other carboxylic acids, acid anhydrides, or acid chlorides, etc., or etherified with alkylene oxides, alkyl halides, phenyl glycidyl ethers, alkylene chlorohydrins or epoxy chlorohydrins, etc., to impart desired properties to the resultant polymer. For instance, the condensates may be partially esterified with substituted phosporic acids and/or chlorinated acids to impart flame resistance or other desirable properties to the resin. Other types of resins which may be prepared are resins containing both reactive unsaturation and reactive epoxy groups in which a phenol-aldehyde condensate is first partially reacted with an unsaturated acid chloride such as acrylyl chloride and then reacted with epichlorohydrin.

The temperature for the esterification reaction can vary from about zero to one hundred and twenty degrees centigrade. When the acid anhydrides are used, the preferred reaction temperature is in the range from about eighty to one hundred and twenty degrees centigrade, and a ten to twenty percent excess of anhydride over the stoichiometric ratio is employed. A strong acid catalyst such as 0.1 to 1.0 percent of sulfuric acid is preferred. An inhibitor such as 0.1 percent of a quinone can be utilized. Several methods of preparation are available when acid chlorides are used in the esterification reaction. In one method, a ten percent excess of the acid chloride over the stoichiometric ratio is employed, and the reaction is conducted in a hydrocarbon solvent such as benzene at a preferred temperature in the range of about eighty to ninety degrees centigrade. Reaction time normally runs about one to two hours and an inhibitor such as 0.01 percent of a quinone can be used. In the just described reaction, hydrogen chloride evolves. It is often desirable to provide a hydrogen halide acceptor such as triethyl amine. In such an instance, the reaction temperature is preferably about twenty-five to thirty-five degrees centigrade, a one to five percent excess of acid chloride over the stoichiometric requirement is provided, and a solvent such as methylene chloride is used in an amount of about ten times the weight of the resin. A fifty percent excess of acid acceptor over that theoretically required is normally used. In still another method of utilizing an acid chloride for the esterification reaction, an interfacial technique is employed. The second phase is provided by dissolving the phenolic resin in an alkali metal solution. For example, ten percent solutions of sodium hydroxide or potassium hydroxide can be used in an amount sufficient to provide a ten to twenty percent excess over the amount required to produce the salt of the phenolic resin. The acid chloride can be dissolved in a solvent such as methylene chloride that is provided in an amount of about ten times the weight of the resin. In this method, the preferred reaction temperature is about zero to twenty degrees centigrade and a five to ten percent excess of acid chloride over the stoichiometric requirement is used. Reaction time is one to two hours and vigorous agitation is required to insure good contact between the phases.

The resultant ethylenic polymer may be cured by cross-linking in the presence of a catalytic amount of a conventional polymerization catalyst for additional polymerization of ethylenically unsaturated materials, including free radical catalysts such as benzoyl peroxide and other organic peroxides. The polymer may also be cured by copolymerization with an ethylenically unsaturated monomeric material copolymerizable therewith, and preferably in the presence of a catalytic amount of a polymerization catalyst such as mentioned above.

The ethylenically unsaturated monomers which may be used in curing or cross-linking the ethylenically unsaturated resins of the present invention may be varied widely. While other materials may be used, it is preferred that addition polymerization be practiced since no by-product ammonia, water, etc. is formed and the problems resulting therefrom are not experienced. The monomers useful in curing the thermoplastic unsaturated polymers include vinylic compounds or mixtures thereof capable of cross-linking ethylenically unsaturated polymer chains at their points of unsaturation and usually they contain the reactive group $H_2C=C<$. Specific examples include styrene, chlorostyrenes, methyl styrenes such as alpha methyl styrene, p-methyl styrene, divinyl benzene, indene, unsaturated esters such as: vinyl acetate, methyl methacrylate, methyl acrylate, allyl acetate, diallyl phthalate, diallyl succinate, diallyl adipate, diallyl sebacate, diethylene glycol bis(allyl carbonate), triallyl phosphate and other allyl esters, and vinyl toluene, diallyl chlorendate, diallyl tetrachlorophthalate, the lower aliphatic esters other than methyl of methacrylic and acrylic acids, ethylene glycol diacrylate, dimethacrylate, diethacrylate, etc. The monomer may be admixed in the polymer in an amount sufficient to produce a thermoset polymer and the admixture heated to an elevated temperature in the presence of a suitable catalyst to cross-link or cure the polymer. With proper catalyst systems such as benzoyl peroxide and dimethyl aniline, room temperature cures are obtained.

To prepare laminating resins, monomers which will copolymerize with the half esters of the dibasic unsaturated acids or ether linkages may be used. These include styrene, vinyltoluene, diallyl phthalate, triallyl phosphate and other allyl esters, methylstyrenes, vinyl acetate, acrylate, and methacrylate esters, divinyl benzene, chlorostyrenes, etc.

Since the novolaks are polyfunctional materials containing, for example, three to twelve phenolic nuclei, a portion of these may be modified by esterifying part of the phenolic hydroxyls with high boiling acids by direct esterification at elevated temperatures. The phenolic hydroxyls may also be partially esterified with monobasic acid anhydrides or acid chlorides evolving hydrogen chloride.

In accordance with still other aspects of the invention, it is possible to employ the improved polymers of the invention in the preparation of plastic articles in general, reinforced plastic articles containing a reinforcement such as cloth, glass fibers in the form of roving, individual glass fibers, etc., and laminates or other filled resin compositions. Surprisingly, such prepared materials exhibit vastly improved physical properties such as discussed above for the polymers of the invention. Suitable reinforcements or laminations for preparing the reinforced articles and laminates include textile fibers or cloth, glass fibers or cloth, roving, etc. Castings may be prepared from the improved polymers of the present invention and such products likewise have been found to exhibit the improved properties of the polymers discussed above to a surprising degree. In general, well known processes of the prior art may be used for preparing the above-mentioned plastic articles, reinforced plastic articles, laminates or other filled resin compositions, and castings, with the exception of substituting the improved polymer of the invention for that conventionally used. Usually, other changes in the process are not necessary. It is usually preferred that a thermoset polymer be present in the finished article.

The following are examples of suitable reinforcing media that can be used with the polymers of the invention: glass fibers, glass mats, glass cloth, synthetic fibers such as orlon, mineral fibers such as asbestos, natural fiber such as cotton, silk and wool, and metallic fibers such as aluminum and steel.

Following are examples of fillers that can be used in the polymers of the invention: inorganic materials such as calcium carbonate, clay and pigments, and organic materials such as wood flour, cotton and rayon flock, sisal fibers and dyes.

The foregoing detailed description and the following specific examples are for purposes of illustration only and are not intended as being limiting to the spirit or scope of the appended claims.

EXAMPLE 1

This example illustrates the preparation of a phenolic novolak from the following:

| | Grams |
|---|---|
| Phenol (9 moles) | 846 |
| Formaldehyde (37%) (6 moles) | 486 |
| Hydrochloric acid (37%) | 11.1 |

The phenol and concentrated hydrochloric acid were placed in a two-liter, three-necked flask fitted with a stirrer, thermometer, reflux condenser and dropping funnel and maintained at fifty degrees centigrade. The formaldehyde was added slowly allowing the reaction to come to reflux at one hundred to one hundred and five degrees centigrade, and reflux continued until all of the formaldehyde is consumed. The apparatus was arranged for distillation and the water distilled off to a pot temperature of two hundred degrees centigrade. Vacuum was applied to remove most of the free phenol followed by finishing by steam distillation at one hundred and eighty to two hundred degrees centigrade to remove the remaining free phenol. The yield was 773 grams of resin having a melting point of seventy-two to eighty-one degrees centigrade. The resin had an average of about five phenolic nuclei per mole unit.

Similarly other resins for use in the invention can be prepared by reacting the substituted phenols or the higher aldehydes enumerated hereinbefore. Likewise it is within the scope of the invention to add substituents to the phenol-aldehyde resins after their preparation, such as by alkylation of the phenolic nuclei with styrene.

EXAMPLE 2

One hundred fifty-six grams of the resin from Example 1 was placed in a two-liter, three-necked flask, dissolved in three hundred milliliters of water containing seventy-two grams sodium hydroxide, and then cooled in an ice-salt bath to zero degrees centigrade. To this was added dropwise over five hours one hundred and fifty grams of acrylyl chloride in eight hundred and sixty-four milliliters of methylene chloride while maintaining the temperature of the reactants at zero to three degrees centigrade. The aqueous layer was decanted and the methylene chloride solution of resin was washed with water until free of sodium chloride. The resin solution was dried over calcium sulfate, 0.24 gram hydroquinone added and the solvent distilled off. The resultant product was a pale amber viscous resin.

EXAMPLE 3

Another resin was prepared as described in Example 2 except that 149.4 grams of methacrylyl chloride was substituted for the acrylyl chloride. The resultant resin was a pale amber viscous liquid.

EXAMPLE 4

One hundred four grams of the novolak from Example 1 was placed in a two-liter, three-necked flask, dissolved in three hundred grams of water containing forty-four grams of NaOH and cooled in an ice-salt bath to zero degrees centigrade. To this was added dropwise 39.8 grams of acrylyl chloride in one hundred milliliters of methylene chloride while maintaining the temperature of the reactants at zero to five degrees centigrade. Then, one hundred and sixty-two grams of diphenyl phosphoryl chloridate in three hundred and fifty milliliters of methylene chloride was added while maintaining the reactants at zero to five degrees centigrade. The aqueous layer was decanted off and the methylene chloride resin solution was washed with water until free of chloride. Hydroquinone in an amount of 0.1 percent by weight was added and the methylene chloride was distilled off. Vacuum was applied at a temperature of eighty degrees centigrade to remove all solvent. The resultant resin contained 6.7 percent phosphorus.

EXAMPLE 5

One hundred fifty-six grams of the novolak of Example 1 is dissolved in four hundred milliliters of water containing sixty-five grams of sodium hydroxide and the solution is cooled to zero to five degrees centigrade. Then, a solution of 266.4 grams of a chlorinated benzoyl chloride containing an average of 4.5 nuclear chlorine atoms per mole and dissolved in six hundred milliliters of methylene chloride solvent is added slowly while maintaining the temperature at zero to five degrees centigrade. Then, 59.7 grams of acrylyl chloride dissolved in two hundred milliliters of methylene chloride is added. The methylene chloride resin solution is separated, washed and treated as described in Example 4. The resultant resin has a melting point of eighty-seven to ninety-two degrees centigrade and a chloride content of 31.4 percent.

EXAMPLE 6

Fifty-two grams of the novolak of Example 1, 55.5 grams of acrylyl chloride and fifty milliliters of benzene are placed in a glass flask and heated to eighty degrees centigrade for five hours. During this period 0.5 mole of hydrogen chloride is evolved. The benzene and excess acrylyl chloride are removed by vacuum distillation and 0.008 gram hydroquinone is added to the resultant viscous resin.

EXAMPLE 7

Another resin was prepared as described in Example 6 except 57.5 grams methacrylyl chloride was substituted for the acrylyl chloride. The resultant product was a viscous resin.

EXAMPLE 8

Sixty grams of the resin from Example 2 was mixed with twenty grams of styrene and catalyzed with 0.8 gram of Luperco ATC (a paste containing fifty percent by weight of benzoyl peroxide in tricresyl phosphate). A plate casting 0.2 inch thick was prepared and cured sixteen hours at fifty degrees centigrade, twenty-four hours at one hundred and twenty degrees centigrade and one hour at one hundred and sixty-five degrees centigrade. Heat distortion ASTM D648–56 using two hundred and sixty-five p.s.i. fiber stress was one hundred and ninety-eight degrees centigrade.

EXAMPLE 9

Sixty grams of the resin from Example 5 was mixed with twenty grams of styrene and catalyzed with 1.6 grams of Luperco ATC. A plate casting 0.2 inch thick was prepared and cured as described in Example 8. The heat distortion was one hundred and five degrees centigrade and the resin was self-extinguishing by ASTM 635–56T.

EXAMPLE 10

Sixty grams of the resin from Example 4 was mixed with twenty grams of styrene and catalyzed with 1.6 grams of Luperco ATC. A plate casting 0.2 inch thick was prepared and cured as described in Example 8. The heat distortion temperature was fifty-one degrees centigrade. The resin was self-extinguishing by ASTM D635–56T.

EXAMPLE 11

A solution of sixty grams of the resin of Example 2 dissolved in sixty grams of methylene chloride was catalyzed with 1.2 grams of Luperco ATC. Six five by seven inch plies of 181 glass cloth provided with a Volan A finish were impregnated with the catalyzed resin solution and dried in a forced air oven at forty degrees centigrade. A laminate was prepared from the resultant cloth and cured in a press at forty-five p.s.i. for thirty minutes at eighty degrees centigrade, fifteen minutes at one hundred and five degrees centigrade, fifteen minutes at one hundred and twenty degrees centigrade, and then post-cured twenty-four hours at one hundred and twenty degrees centigrade. The laminate had a Barcol hardness of sixty-eight and a flexural strength of 34,000 p.s.i.

EXAMPLE 12

A solution of thirty grams of the resin of Example 2 and thirty grams of triallyl cyanurate was catalyzed with 1.1 grams of Luperco ATC. Six five by seven inch plies of 181 glass cloth provided with a Volan A finish were impregnated with the resin solution, the laminate prepared and cured in a press at forty-five p.s.i. as described in Example 11, and post cured for sixteen hours at one hundred and fifty degrees centigrade. The temperature was raised over four hours to two hundred and sixty degrees centigrade, and then held at two hundred and sixty degrees centigrade for three hours. The laminate had a Barcol hardness of seventy-two with flexural strength of 45,000 p.s.i.

EXAMPLE 13

A solution of forty grams of the resin of Example 2 and twenty grams of methyl methacrylate was catalyzed with 1.2 grams of Luperco ATC. A laminate was prepared and cured as described in Example 12, and then post cured for twenty-four hours at one hundred and twenty degrees centigrade. The laminate had a Barcol hardness of sixty-eight and a flexural strength of 42,500 p.s.i.

EXAMPLE 14

A solution of forty grams of the resin of Example 2 and twenty grams of styrene was catalyzed with 1.2 grams of Luperco ATC. A laminate was prepared, cured and post cured as described in Example 13. The laminate had a Barcol hardness of fifty and a flexural strength of 27,400 p.s.i.

EXAMPLE 15

A solution of forty grams of the resin of Example 3 and twenty grams of methyl methacrylate was catalyzed with 1.2 grams of Luperco ATC. A laminate was prepared, cured and post cured as described in Example 12. The laminate had a Barcol hardness of sixty and a flexural strength of 35,000 p.s.i.

EXAMPLE 16

Another resin was prepared as described in Example 2 except that 149.4 grams of crotonyl chloride was substituted for the acrylyl chloride. The resultant resin was a pale amber viscous liquid. It was useful in preparing a cured laminate as described in Example 12.

EXAMPLE 17

One hundred four grams of a novolak similar to that of Example 1, 0.1 gram of sulfuric acid, two hundred and eighty grams of acrylic anhydride and 0.02 gram of tolyl quinone were heated for two hours at one hundred to one hundred and ten degrees centigrade. The resin was washed with hot water until free of acid and dried by heating to one hundred to one hundred and ten degrees centigrade under vacuum. The resulting resin was useful in preparing a cured laminate as described in Example 12.

In the foregoing specification, the acid chlorides have been indicated to be the preferred acid halides for use in the esterification reaction. However the acid bromides and acid iodides corresponding to the acid chlorides disclosed herein are also suitable, but are more costly to use.

When the ethylenically unsaturated thermoplastic polymers are cross-linked with an ethylenically unsaturated monomer, the ratio of monomer to polymer can be varied widely depending on the particular reactants, desired polymer properties, and the like, but will generally not exceed about one hundred and fifty parts by weight of monomer per one hundred parts of thermoplastic polymer.

EXAMPLE 18

A novolak with an average of three phenolic nuclei per molecule was prepared using components in the following proportions:

|  | Grams |
|---|---|
| Phenol (12 moles) | 1128 |
| Formaldehyde (37.1% CH$_2$O) (5.11 moles) | 486 |
| Sodium alkyl arylsulfonate | 2.3 |
| Oxalic acid | 5.6 |

The phenol, oxalic acid and sodium alkyl arylsulfonate wetting agent were charged to a reaction vessel equipped with a stirrer, thermometer, reflux condenser and dropping funnel. The mixture was heated to 100° C. and the formaldehyde solution was added slowly, allowing the reaction mixture to reflux at 100°–105° C. Refluxing was continued for one hour after the addition of formaldehyde was completed. Then, the water and phenol were distilled off until the temperature reached 130° C. Vacuum was then applied and the distillation was continued until the temperature reached 190° C. at 25 mm. pressure. The yield of resin was 767 grams, and the resin had a melting point of 38–48° C.

EXAMPLE 19

One hundred two grams of the resin of Example 18 were dissolved in 1000 grams of methylene chloride and 131 grams of triethylamine in a reaction vessel. To the solution were slowly added 114 grams of methacrylyl chloride. The heat of reaction was permitted to reflux the methylene chloride. Reflux was continued for three hours at 40° C. The reaction mixture was cooled and 200 ml. of 20% hydrochloric acid were added to convert all of the triethylamine to the hydrochloride and to dissolve it in water. The methylene chloride solution was separated from the aqueous solution; washed with water until free of chloride, and dried over magnesium sulfate. After filtering off the magnesium sulfate, 0.04 gram of toluhydroquinone was added as inhibitor, and the solvent was removed by vacuum distillation. A resin with a Gardner viscosity of X–Y was obtained.

EXAMPLE 20

One hundred grams of the resin of Example 19 were mixed with 40 grams of styrene and 2.8 grams of a paste comprising 50 parts by weight of benzoyl peroxide and 50 parts by weight of tricresylphosphate. A casting was made by pouring the resin between cellophane covered steel plates separated by a gasket and ⅛″ shims. The casting was heated 16 hours at 50° C., followed by 24 hours at 120° C. The casting was removed and cut into two pieces. One piece was further cured for 4 hours at 160° C.

The heat distortion temperature at 264 p.s.i. fiber stress by ASTM was 191° C. on the 120° C. cured casting and 219° C. on the 160° C. cured casting.

While the invention has been described with reference to certain specific embodiments, it will be recognized by those skilled in the art that many variations are possible without departing from the spirit and scope of the invention.

We claim:

1. A process for preparing a polymer comprising reacting together, to produce a thermoplastic ester derivative, components comprising (1) a fusible, organic solvent soluble condensation product of a phenol and an aldehyde containing condensate units having reactive phenolic hydroxy groups, and an average of at least three phenolic nuclei, and (2) a compound reactive with the phenolic hydroxyl groups selected from the group consisting of the anhydrides and acid halides of ethylenically unsaturated monocarboxylic acids having a carbon chain of not more than six carbon atoms and mixtures thereof, said compound being reacted with more than one hydroxyl group in each condensate unit, and the condensate units of the resultant condensation product containing at least one isolated addition-polymerizable carbon-carbon double bond.

2. The process of claim 1 wherein the condensation product comprises a novolak and the carboxylic acid comprises acrylic acid.

3. The process of claim 1 wherein the condensation product comprises a novolak and the carboxylic acid comprises methacrylic acid.

4. The process of claim 1 wherein the condensation product comprises a novolak and the carboxylic acid comprises crotonic acid.

5. A polymer prepared by a process comprising reacting together, to produce a thermoplastic ester derivative, components comprising (1) a fusible, organic solvent soluble condensation product of a phenol and an aldehyde containing condensate units having reactive phenolic hydroxyl groups, and an average of at least three phenolic nuclei, and (2) a compound reactive with the phenolic hydroxyl groups selected from the group consisting of the anhydrides and acid halides of ethylenically unsaturated mono-carboxylic acids having a carbon chain of not more than six carbon atoms and mixtures thereof, said compound being reacted with more than one hydroxyl group in each condensate unit, and the condensate units of the resultant condensation product containing at least one isolated addition-polymerizable carbon-carbon double bond.

6. The polymer of claim 5 wherein the condensation product comprises a novolak and the carboxylic acid comprises acrylic acid.

7. The polymer of claim 5 wherein the condensation product comprises a novolak and the carboxylic acid comprises methacrylic acid.

8. The polymer of claim 5 wherein the condensation product comprises a novolak and the carboxylic acid comprises crotonic acid.

9. The polymer of claim 5 wherein the condensation product comprises a novolak and the carboxylic component comprises acrylyl chloride and diphenyl phosphoryl chloridate.

10. The polymer of claim 5 wherein the condensation product comprises a novolak and the carboxylic component comprises acrylyl chloride and chlorinated benzoyl chloride.

11. A polymerizable composition of matter comprising the polymer of claim 5 and an ethylenically unsaturated monomer copolymerizable therewith.

12. The polymerizable composition of claim 11 wherein the aldehyde is formaldehyde and the ethylenically unsaturated monomer is styrene.

13. A process for preparing a thermoset polymer comprising admixing the polymer of claim 5 with a catalytic amount of a free radical polymerization catalyst, and polymerizing the admixture to produce a thermoset polymer.

14. A process for preparing a thermoset polymer comprising reacting the polymer of claim 5 with an ethylenically unsaturated monomer copolymerizable therewith in an amount to produce a thermoset polymer, in the presence of a free radical catalyst to produce a thermoset polymer.

15. A thermoset polymer prepared by a process comprising admixing the polymer of claim 5 with a catalytic amount of a free radical polymerization catalyst, and polymerizing the admixture to produce a thermoset polymer.

16. The polymer of claim 15 wherein the condensation product comprises a novolak and the carboxylic acid comprises acrylic acid.

17. The polymer of claim 15 wherein the condensation product comprises a novolak and the carboxylic acid comprises methacrylic acid.

18. A reinforced plastic article comprising the thermoset polymer of claim 15 and a reinforcing medium therefor.

19. A laminated article comprising a plurality of layers of reinforcing medium and as a binder therefor the thermoset polymer of claim 15.

20. A thermoset polymer prepared by a process comprising reacting the polymer of claim 5 with an ethylenically unsaturated monomer copolymerizable therewith in an amount to produce a thermoset polymer, in the presence of a free radical catalyst to produce a thermoset polymer.

21. The polymer of claim 20 wherein the condensation product comprises a novolak and the carboxylic acid comprises acrylic acid.

22. The polymer of claim 20 wherein the condensation product comprises a novolak and the carboxylic acid comprises methacrylic acid.

23. A reinforced plastic article comprising the thermoset polymer of claim 20 and a reinforcing medium therefor.

24. A laminated article comprising a plurality of layers of reinforcing medium and as a binder therefor the thermoset polymer of claim 20.

References Cited

UNITED STATES PATENTS 2,129,685   9/1938   Graves _____ 260—89.5

OTHER REFERENCES

Carswell T.S., Phenoplasts, Interscience Publishers, New York 1947, p. 31, TP986.P4C3.

Martin, The Chemistry of Phenolic Resins, John Niley and Sons, New York, 1956, p.56, TP978 M38.

MURRAY TILLMAN, *Primary Examiner.*

J. C. BLEUTGE, *Assistant Examiner.*